Figure 1:
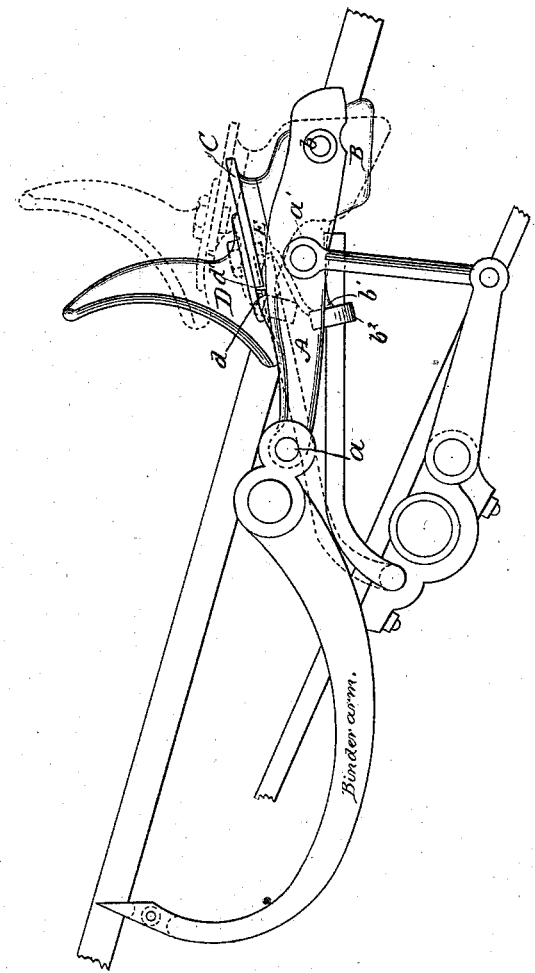

(No Model.)  2 Sheets—Sheet 1.

W. R. BAKER.
GRAIN BINDER.

No. 258,274.  Patented May 23, 1882.

WITNESSES  INVENTOR
  William R. Baker
  By his Attorneys

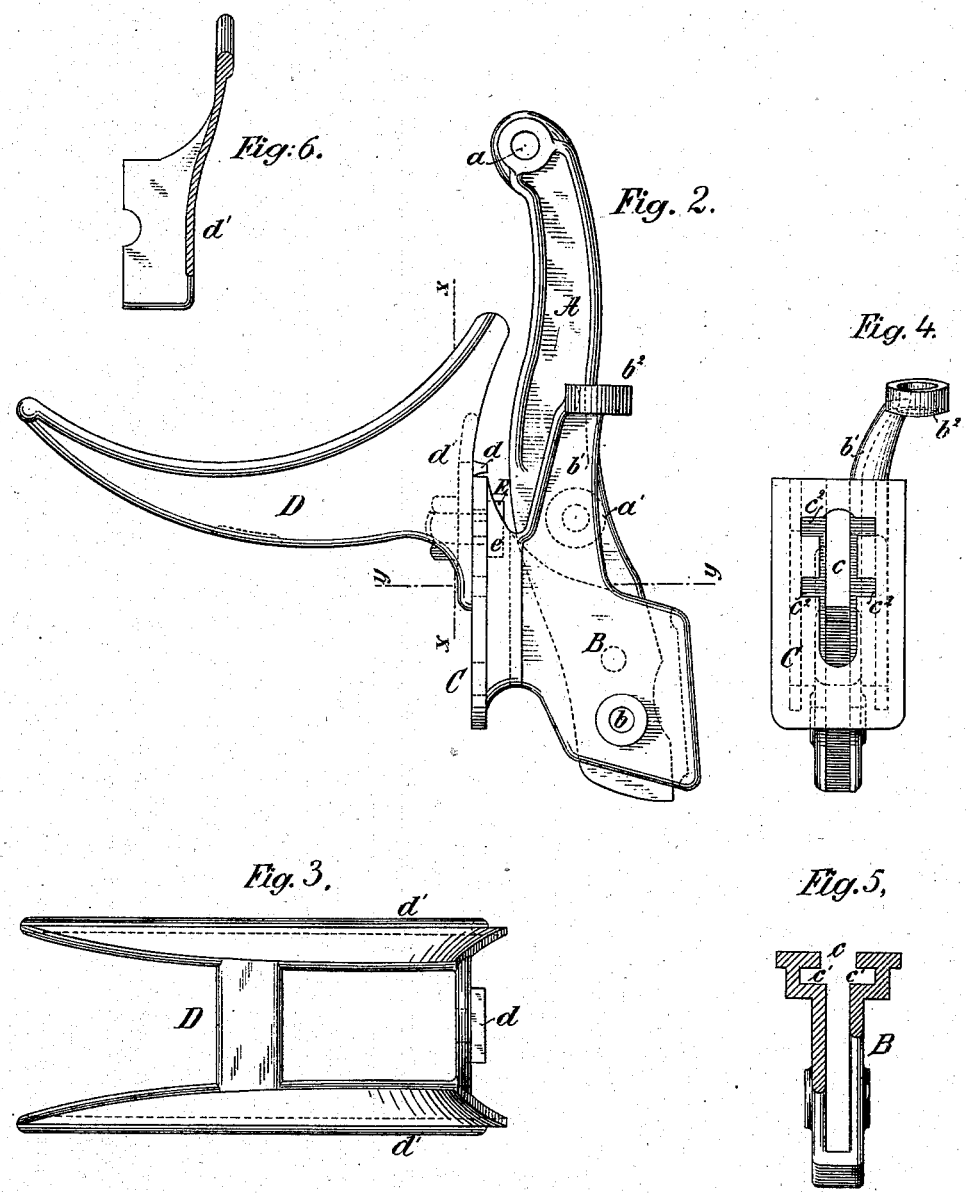

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

GRAIN-BINDER.

SPECIFICATION forming part of Letters Patent No. 258,274, dated May 23, 1882.

Application filed December 16, 1881. (No model.)

*To all whom it may concern:*

Be it known that I, WILLIAM R. BAKER, of Chicago, in the county of Cook and State of Illinois, have invented certain new and useful Improvements in Grain-Binders, of which the following is a specification.

In the McCormick twine binding-harvester placed upon the market during the past season the automatic binding mechanism is thrown into action by the accumulation and compacting of the gavel against a tripping-arm, which yields or rocks to a certain extent under the pressure, and thereby causes the engagement of a clutch between a shaft or pinion of the binder and a constantly driven portion of the harvester gearing to start said binder. For this purpose the tripping-arm in said machine, being located in the lower or outer part of the grain-receptacle, is pivoted to a sustaining-bar, and has a heel-extension beyond its pivot-shank, so as to form practically an elbow-lever. An eye upon this heel-extension receives an arm from a rock-shaft, so that the latter may be rocked or oscillated by the leverage of the tripping-arm as it yields before the accumulating gavel, and this rock-shaft is connected by intermediate mechanism with the clutch between the harvester and the binder. The sustaining-bar, which carries the tripping-arm, is pivoted at its upper or inner end and supported at a point along its length by a link, which in its turn is carried by a lever mediately or immediately controlled by a cam, so that the tripping-arm may at the proper time be withdrawn beneath the decking or grain receptacle to permit the discharge of the bound sheaf. In order to regulate the size of the gavels, the sustaining-bar has a series of perforations along its length, any one of which may receive the pivot-pin of the tripping-arm, thus bringing it nearer to or removing it farther from the packing mechanism, and allowing the tripping pressure to be given by a diminished or increased quantity of grain. This adjustment along the sustaining-bar, however, changes the distance between the eye on the heel-extension of the tripping-arm and the rock-shaft, which controls the clutch and shortens or extends the effective length of the lever-arm passing through said eye, so as to effect a very considerable and oftentimes undesirable change in the resistance offered by the tripping-arm to the pressure of the incoming grain.

To remedy this and other incidental defects is the object of the present invention; and it consists in constructing the tripping-arm in two sections, one of which is permanently pivoted to the sustaining-bar, and has the heel-extension and eye, as above related, and the other of which is adjustable along the first, so as to increase or decrease the grain receiving and compacting space without disturbing the pivot.

In the drawings, Figure 1 is a side elevation of a sustaining-bar and tripping-arm constructed according to my invention arranged in proper relation to the binder-arm and tripping rock-shaft; Fig. 2, an opposite side elevation of the sustaining-bar and tripping-arm detached and enlarged; Fig. 3, a rear or outside view of the upper section of the tripping-arm; Fig. 4, a plan of the lower section of said arm; Fig. 5, a view from the inner or grain side of said lower section, broken away on the line $y\,y$ of Fig. 2; and Fig. 6, a section, on line $x\,x$ of Fig. 2, of a portion of the upper part of the tripping-arm.

A is the sustaining-bar, pivoted at $a$, and having a socket, $a'$, for the reception of the upper end of its supporting and actuating link. This bar may be made of wrought-iron, while the sections of the tripping-arm will ordinarily be of sufficient strength when composed of malleable cast-iron. To the sustaining-bar is pivoted, at $b$, the lower section, B, of the tripping-arm, said section having a heel-extension, $b'$, and an eye, $b^2$, for the reception of the arm from the rock-shaft, as hereinbefore explained. The body part of this section is made as a sleeve, as indicated in Fig. 5, to fit over and closely embrace by its side walls the sustaining-bar, while at the same time allowing pivotal play. At the top this section is widened out to form a broad supporting plate or base, C, for the upper section, D. Centrally along this base is a slot, $c$, which receives the shank of a bolt, E, from the upper section, and at each side of the slots are ways or channels $c'$, which receive, confine, and guide the head $e$ of said bolt. Cross-slots $c^2$ are made at regular distances along the length of the central slot in the base, any one of which is adapted to receive a tongue, d, depending from the upper section. The latter can therefore be adjusted along the base section at any time by simply loosening the nut upon the screw-bolt and moving the tongue from one cross-slot to another, or moving it to the extreme inner edge of the base-plate as a final adjustment.

Instead of the cross-slots and tongue, it is evident that the surface of the base-plate and the bottom of the upper section may be roughened or serrated with like effect, so far as the positiveness of the adjustment is concerned.

The sides d of the upper section of the tripping-arm are made flaring, as in Figs. 2 and 3, so that they may in a measure saddle the lower section or project below the base, thereby obviating any liability to clog, and presenting an unbroken curved outline or front at all points above the decking.

The foregoing construction gives a broad range of adjustment sufficient for all ordinary purposes; but it may be desirable in some cases to accompany it with a limited capacity of adjustment upon the sustaining-bar, so that a change of leverage may be secured with or without an increase or decrease in the grain-receiving space. The sustaining-bar may therefore have two or more pivot-holes to permit the lower section of the tripping-arm to be adjusted thereupon, while the upper section may either follow this adjustment or be independently adjusted.

What is claimed as said invention is—

1. The combination of the sustaining arm or bar, a section of a compressing and tripping arm pivoted thereto, and a second section adjustably connected to the first, so as to increase or diminish the grain-receiving space.

2. The combination of the sustaining-arm, the lower section of the tripping-arm pivoted thereto, and the upper section of said tripping-arm adjustable along the other.

3. The combination of the sustaining-bar, the lower section of the tripping-arm pivoted thereto and having heel-extension and eye, and the upper section adjustable along the top of the lower.

4. The combination of the lower section of the tripping-arm, its base-plate having longitudinal and cross slots and channels, the upper section formed with a pendent tongue and the bolt uniting the two.

5. The upper section of the tripping-arm formed with flaring sides, embracing or saddling the lower section or shank.

6. The combination of a tripping-arm made in sections, one of which is adjustable along the top of the other, with a sustaining-bar, to which the lower section is pivoted, and along which it is adjustable.

WILLIAM R. BAKER.

In presence of—
JOHN V. A. HASBROOK,
CHAS. COLABAR.